US012512993B2

(12) United States Patent
Kaizer et al.

(10) Patent No.: US 12,512,993 B2
(45) Date of Patent: Dec. 30, 2025

(54) VERIFIER CREDENTIAL DETERMINATION BY A REGISTRANT

(71) Applicant: Verisign, Inc., Reston, VA (US)

(72) Inventors: Andrew Kaizer, Arlington, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 181 days.

(21) Appl. No.: 18/238,416

(22) Filed: Aug. 25, 2023

(65) Prior Publication Data

US 2023/0403154 A1 Dec. 14, 2023

(51) Int. Cl.
*H04L 9/32* (2006.01)

(52) U.S. Cl.
CPC ............ *H04L 9/3218* (2013.01); *H04L 9/321* (2013.01)

(58) Field of Classification Search
CPC ......... H04L 9/3218; H04L 9/321; H04L 9/40; H04L 63/12; H04L 63/123; H04L 9/50; H04L 9/32
See application file for complete search history.

(56) References Cited

U.S. PATENT DOCUMENTS

| | | | | |
|---|---|---|---|---|
| 11,533,161 | B1 * | 12/2022 | Fregly | ................. H04L 63/0823 |
| 12,316,610 | B1 * | 5/2025 | Muth | .................. H04L 63/0435 |
| 2007/0106612 | A1 | 5/2007 | O'Brien | |
| 2017/0195286 | A1 | 7/2017 | Stahura | |
| 2019/0068608 | A1 | 2/2019 | Boland | |
| 2019/0230092 | A1 | 7/2019 | Patel | |
| 2019/0333054 | A1 | 10/2019 | Cona | |
| 2020/0162424 | A1 | 5/2020 | Waldron | |
| 2020/0296102 | A1 | 9/2020 | Buchner | |
| 2020/0296140 | A1 | 9/2020 | Buchner | |
| 2021/0058403 | A1 | 2/2021 | Murdoch | |
| 2021/0092019 | A1 | 3/2021 | Fang | |
| 2022/0385645 | A1 | 12/2022 | Murdoch | |
| 2023/0403254 | A1 | 12/2023 | Kaizer | |
| 2024/0372827 | A1 * | 11/2024 | Hsu | ..................... H04L 61/3025 |

FOREIGN PATENT DOCUMENTS

WO 2019143580 A1 7/2019

OTHER PUBLICATIONS

Office Action for U.S. Appl. No. 18/238,411, mailed on Nov. 21, 2024, Kaizer, "Decentralized Identifier Determination by a Registry Operator or Registrar ", 39 Pages.

(Continued)

*Primary Examiner* — Quazi Farooqui
(74) *Attorney, Agent, or Firm* — Lee & Hayes, P.C.

(57) ABSTRACT

Techniques for associating verifiable credentials with a decentralized identifier are described herein. A computing device can determine a link between a decentralized identifier (DID) and a domain name, and assign a verifiable credential to the DID to invoke an action associated with the domain name. For example, the verifiable credential can be used to control an identifier on a platform different than the domain name. In some examples, a registrar can validate an identity of the registrant based on the decentralized identifier. The computing device can use the verifiable credential identified in the decentralized identifier to provide secure verifications of an identity.

20 Claims, 5 Drawing Sheets

(56) References Cited

OTHER PUBLICATIONS

Office Action for U.S. Appl. No. 18/238,411, mailed on Aug. 20, 2024, Kaizer, Decentralized Identifier Determination by a Registry Operator or Registrar, 36 Pages.

Decentralized Identifiers (DIDs) v1.0, Core architecture, data model, and representations; W3C Recommendation; Jul. 19, 2022; retrieved from https://www.w3.org/TR/did-core/; 110 pages.

ICANN 76 Cancun DID to DNS with DNSSEC; CIRA presented on Mar. 15, 2023; 22 pages.

Verifiable Credentials Data Model v1.1; W3C Recommendation; Mar. 3, 2022; https://www.w3.org/TR/vc-data-model/; 127 pages.

Office Action for U.S. Appl. No. 18/238,411, mailed on Mar. 26, 2024, Kaizer, "Decentralized Identifier Determination by a Registry Operator or Registrar", 30 Pages.

Office Action for U.S. Appl. No. 18/238,411, dated Apr. 28, 2025, 38 Pages.

* cited by examiner

```
┌─────────────────────────────────────┐
│ DETERMINE DATA REPRESENTING A LINK  │
│ BETWEEN A DECENTRALIZED IDENTIFIER  │
│ AND A DOMAIN NAME ASSOCIATED WITH   │
│           A REGISTRANT              │
│                 402                 │
└─────────────────────────────────────┘
                  │
                  ▼
┌─────────────────────────────────────┐
│  GENERATE, BASED AT LEAST IN PART   │
│  ON THE DATA, A VERIFIABLE          │
│  CREDENTIAL TO INVOKE AN ACTION     │
│  ASSOCIATED WITH THE DECENTRALIZED  │
│  IDENTIFIER, THE VERIFIABLE         │
│  CREDENTIAL IDENTIFYING THE         │
│  DECENTRALIZED IDENTIFIER AS A      │
│  CONTROLLER OF AN IDENTIFIER        │
│  ASSOCIATED WITH A PLATFORM         │
│                 404                 │
└─────────────────────────────────────┘
                  │
                  ▼
┌─────────────────────────────────────┐
│  TRANSMIT THE VERIFIABLE CREDENTIAL │
│  TO A VERIFIER TO CAUSE THE         │
│  VERIFIER TO PERFORM THE ACTION     │
│  ASSOCIATED WITH THE                │
│  DECENTRALIZED IDENTIFIER           │
│                 406                 │
└─────────────────────────────────────┘
```

VERIFIER CREDENTIAL DETERMINATION BY A REGISTRANT

BACKGROUND

Registered domain names direct users to content over the Internet. To register a domain name, a registrant provides contact information and payment to a registrar. The registrar can confirm jurisdiction requirements for registering the domain name and interacts with a registry operator that maintains a registry of domain names. The domain name, or storage thereof, can be subject to regulatory compliance to ensure proper handling and storage of contact information associated with the domain name. Verifying content associated with the domain name typically includes a central repository of data storing links to an address that then further requires validation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

This application describes techniques for linking a decentralized identifier (DID) and a verifiable credential (VC) to enable a domain name to claim an association with other identifiers. For example, a computing device associated with a registrant can link a domain name and a decentralized identifier in a registry, file, document, memory, etc. The computing device can assign, associate, generate, configure, or otherwise determine one or more verifiable credentials to enable the domain name identified in the decentralized identifier to claim an association with other identifiers (e.g., a blockchain, a phone number, a unique identifier of a social media platform, or other platform such as a gamertag, and so on). In various examples, the computing device can generate the verifiable credential for the domain name to verify content associated with the domain name (e.g., verify an image or other content associated with the domain name).

The computing device can configure a verifiable credential in a variety of ways to cause different functionality to be performed when the verifiable credential is processed by a same or different computing device. For instance, a first verifiable credential can be configured to make a claim about the domain name such as to verify that a user, image, or content is associated with the domain name (whether or not output for display on a display device). The first verifiable credential can include content indicating that the domain name (and/or the registrant of the domain name) controls another identifier associated with another domain name. For example, the decentralized identifier can be included in a field of a verifiable credential (or vice versa) to indicate that "the decentralized identifier X controls the unique identifier Y on platform Z". In this example, the decentralized identifier can be associated with a registrant and claims control of a social handle, or other identifier, on another platform.

Using the techniques for associating verifiable credentials with a decentralized identifier as described herein, a computing device associated with a registrant, a registrar, and/or a registry operator can extend the utility of the domain name by exchanging verifiable credentials as a trust chain of two or more identifiers. The computing device can, for example, configure messages for sending to various other computing devices that include the verifiable credential to authorize various actions on behalf of the domain name. Additionally, or alternatively, the computing device can generate a verifiable credential for storing in memory and/or for making a claim associated with domain name (e.g., a self-issued credential that claims an image, name, or other information associated with the domain name).

In various examples, a single decentralized identifier can include multiple verifiable credentials that further includes different identifiers resulting in multiple identifiers being associated with the single decentralized identifier without requiring a central registry to manage and store the identifiers separately. A central registry may be associated with each platform to store user identifiers or other information. The platform can include one or more domain names which may be associated with a variety of different services provided via a network. By associating decentralized identifiers and verifiable credentials as described herein, information common to an end user (e.g., multiple identifiers for different platforms) can be securely transmitted to show proof or evidence of an identity or content instead of relying on a network to exchange data from the central registry or database. Verifiability of information can be improved by the associated links that represent secure, trusted, and authorized connections which may include a verifiable credential to assert a claim.

In some examples, the computing device can configure a verifiable credential to provide proof that a verified user account of a first domain name or first platform is a same entity as another user account of a second domain name or second platform. For example, the verifiable credential can be used to provide proof that the two user accounts associated with the different domain names and/or different platforms are controlled by a same entity (e.g., computing device, company, user, etc.).

By way of example and not limitation, a graduate of a university can request that the university send certification of grades, a diploma, or other information. For instance, the graduate can have a user account associated with a domain name registered by the university, and send, by a first computing device, a message to a second computing device associated with the university. In this example, the domain name can be previously linked to a decentralized identifier such as when the university registered the domain name. Using the techniques describe herein, the university (e.g., the second computing device) can generate a verifiable credential to certify, verify, or validate the requested information. The graduate (e.g., the first computing device) can receive a verifiable credential instead of relying on a link to an unreliable Internet address as proof that the diploma was earned from the university. Further, the graduate can share the verifiable credential with other devices or parties as needed to provide verification of the diploma. Further, since the verifiable credential is issued by the university and linked to the university's domain name, any entity the graduate provides the verifiable credential to can validate that the credential came from a decentralized identifier linked to a human-friendly and familiar domain name instead of a potentially human-unfriendly decentralized identifier which can enhance trust that the credential is valid and should be trusted. In various examples, the graduate can further control, via the verifiable credential, what details are certified (e.g., specific personal information, a diploma or other record, and so on).

In the preceding example, the university can represent a registrant that registers a domain name associated with a domain name system, and further registers the domain name with a decentralized identifier. For example, the registrant can register the domain name with a registry operator and identify a link between the decentralized identifier and the domain name in a decentralized identifier document. A computing device associated with the registrant can, for instance, implement one or more components to generate and associate a verifiable credential(s) with the decentralized identifier. Subsequent exchanges of data between the registrant, the registry operator, and/or one or more verifiers can include the decentralized identifier, which when processed, enables use of the associated verifiable credentials (e.g., confirms the information or action included in the verifiable credential as coming from a trusted source).

In various examples, the computing device can determine a bi-directional link between the DID and the domain name to indicate that both the DID and the domain name have verified the link based on information associated with the DID and domain name at the time of evaluation. The DID can be updated by the registrant of the domain name, or an entity assigned control to update the DID, such as using a verifiable credential. Further, the domain name can be updated by the registrant, or an entity assigned to update the domain name, such as modifying a DNS zone file. The bi-directional link can be confirmed by accessing a DID document and domain name data and verifying that certain fields contain the required information to associate the DID and the domain name. Thus, a bi-directional link represents a relationship that indicates the DID is authorized to issue, modify, or revoke claims such as verifiable credentials on behalf of the domain name. Additional details for assigning, using, or otherwise determining a DID to identify a domain name are described herein, including in relation to the following figures.

In various examples, the computing device can detect presence of a DID in a message received from a registrant, a registrar, or a registry operator and perform an action to satisfy a request associated with the message. For example, the computing device can retrieve a DID document associated with the DID and cause an action to be performed based on an instruction in the DID document. Examples actions can include verifying an identity of the registrant (e.g., to a third-party), confirming ownership of a domain name, verifying credentials issued by a registrant, etc.

In various examples, the computing device can determine a verifiable credential (VC) to associate with a DID and/or a domain name. The computing device can assign a verifiable credential to serve a variety of functions as part of domain name registration. Generally, the verifiable credential can include one or more of: a subject, a type, an issuing authority, properties asserted by the issuing authority, origin information, constraints (terms of use, expiration date, etc.), just to name a few. A verifiable credential may be used to show ownership of a domain name such as proving that a DID is the registrant. In some examples, a holder of a verifiable credential can verify identity by outputting a verifiable presentation for sharing with a verifier as proof.

The techniques discussed herein can improve functioning of a computing device in a number of ways. For example, the computing device can implement a model or component to generate a verifiable credential to link to a decentralized identifier. The techniques can include the model of the component optimizing available computational resources by performing operations that limit the impact on the available resources (as compared to not implementing the model). Further, computational resources and network activity associated with storing and processing personal data, user identifiers, etc. can be avoided thereby freeing up such computational resources for other use by the computing device. Functioning of a computing device can also be improved by avoiding use of a registry or memory as a central processing entity for identifiers that can instead be represented using a decentralized identifier and/or a verifiable credential. The techniques can also improve network security by providing a framework that allows for verifying authenticity of data from a source (e.g., a university diploma, an image from a news website, etc.). The techniques can also improve security associated with the domain name lifecycle by providing a system that can automatically invalidate verifiable credentials associated with the domain name.

The techniques described herein can be implemented in a number of ways. Example implementations are provided below with reference to the following figures. However, the scope of the invention is not limited to these specific examples. Although discussed in the context of a registrant, a registrar, or a registry operator, the methods, apparatuses, and systems described herein can be applied to a variety of systems and is not limited to the registrar and the registry operator.

Figure 1:
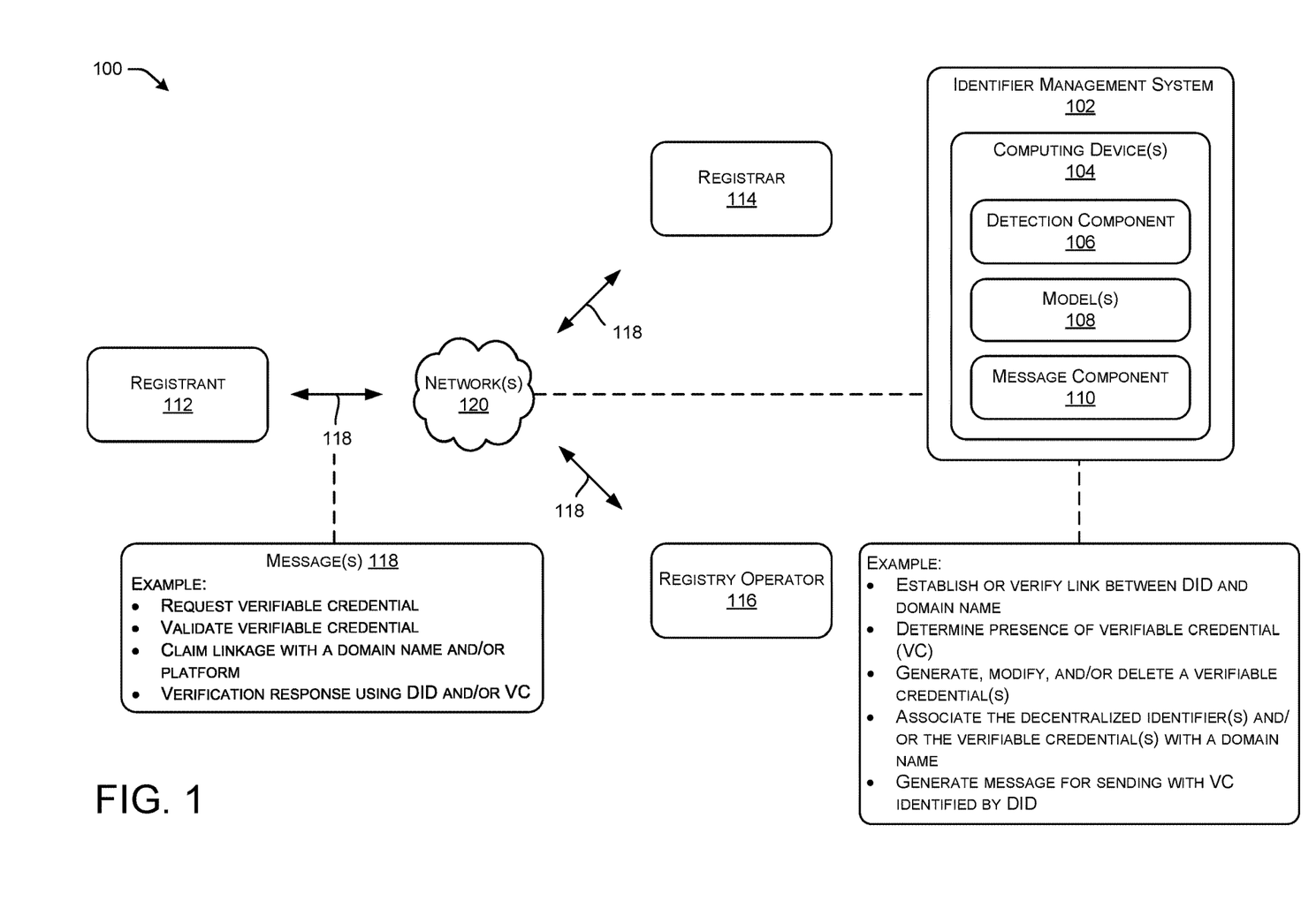
FIG. 1 illustrates a system-architecture diagram of an example environment in which an example identifier management system associates a verifiable credential and a decentralized identifier.

FIG. 1 illustrates a system-architecture diagram of an example environment 100 in which an example identifier management system associates a verifiable credential and a decentralized identifier. For instance, an identifier management system 102 can implement one or more computing devices 104 that include a detection component 106, one or more model(s) 108, and a message component 110 to implement the techniques. For example, the identifier management system 102 can detect, assign, issue, revoke, delete, or otherwise manage verifiable credentials for processing by a registrant 112, a registrar 114, a registry operator 116, a verifier, and/or another entity that processes a domain name.

In some examples, the computing device(s) 104 can be associated with one or more of: the registrant 112, the registrar 114, or the registry operator 116. The computing device(s) 104 can be configured to send and/or receive one or more messages 118 (also referred to herein as "the message 118") over a network 120 (e.g., the Internet). The message 118 can be associated with domain name registration or domain name verification and can include a request to assign a verifiable credential to a domain name. The computing device(s) 104 can verify a link between a domain name identified in the message 118 and a decentralized identifier, and further link the verifiable credential to the domain name (e.g., using the decentralized identifier).

The techniques described herein can be implemented by the registrant 112, the registrar 114, and/or the registry operator 116 depending on the implementation and instructions associated with a particular VC. For example, the identifier management system 102 can implement one or more computing devices 104 to enable a VC to assert a claim using the domain name linked to the DID. In various examples, a decentralized identifier document can be accessed by the registrant 112, the registrar 114, and/or the registry operator 116 to implement the techniques described herein.

In various examples, the computing device(s) 104 can implement the detection component 106 to detect presence of a DID and/or a VC associated with the message 118. For example, the detection component 106 can detect the DID included in the message 118, and parse the DID to identify a verifiable credential (if assigned). The detection component 106 may also or instead identify requests for adding verifiable credentials to one or more decentralized identifiers.

In the earlier example in which the graduate requests verification of some data from the university, the detection component 106 can include functionality to detect such a request and identify a link between the domain name and the DID. If no link exists (e.g., no DID is present in the message 118) then the detection component 106 can generate a message for sending to the model(s) 108 to initiate generating a DID. In some examples, the message 118 can represent a request to provide a DID (e.g., a user is promoted to provide a DID). If a link exists (e.g., the DID is present in the message 118) then the detection component 106 can generate a message for sending to the model(s) 108 to access a DID document. Accessing the DID can enable the model(s) 108 to initiate granting or otherwise associating the verifiable credential to the DID, among others.

The computing device(s) 104 can implement the model(s) 108 to determine an action associated with the message 118 such as generating a VC responsive to a request from the registrant 112, accessing a DID document associated with the DID, verifying an identity of a sender of the message 118, removing data subject to compliance by an entity, and so on. In various examples, the model(s) 108 can be implemented to verify a source and/or accuracy of data associated with a domain name. For instance, a university can generate a verifiable credential to verify or authorize data associated with a website to verify a diploma, grade, personal information, and the like. Additionally, or alternatively, the model(s) 108 can assign a verifiable credential to an image, text, or other content previously displayed or for display at a future time. The model(s) 108 can, for instance, enable a verifier, registrant, or other entity to make claims about data associated with a website so that a source of the data is clear. This can help avoid scenarios where a website is alleged to have posted an image or other content that is later found to be malicious or unverified content. For example, an entity may share content they claim is associated with one domain name to mislead others.

Generally, the model(s) 108 can manage (e.g., create, update, modify, and/or delete) verifiable credentials for use with a decentralized identifier. For instance, the model(s) 108 can enable the registrant 112, the registrar 114 and/or the registry operator 116 to make a claim by a domain name using a verifiable credential, or other similar credential. In some examples, the model(s) 108 can associate the VC with the domain name and the DID in a document stored on a storage device, memory, database, etc.

As described herein, the model(s) 108 may be representative of statistical models, heuristic models, or a combination thereof. That is, a model may refer to a statistical model that is representative of logic and/or mathematical functions that generate approximations which are usable to make predictions.

As mentioned, in various examples, the model(s) 108 can determine a verifiable credential to associate with a DID and/or a domain name. The verifiable credential can include a cryptography key to show ownership of a domain name such as proving that a DID is authorized to represent a domain name registered by the registrant 112. The verifiable credential can represent a subject, a type, an issuing authority, properties asserted by the issuing authority, origin information, constraints (terms of use, expiration date, etc.), etc. A verifiable credential may, in some examples, include instructions, that when performed, prove an identity. One example can include a verifier sharing (e.g., outputting for display) a verifiable presentation as proof of a holder of the verifiable credential. Additional discussion of the model(s) 108, the decentralized identifier, and verifiable credentials can be found throughout this disclosure.

In some examples, the model(s) 108 can establish a link, or verify an existing link, between a DID and a domain name. The link can represent a bi-directional link representing a trusted and secure connection between two entities such as a decentralized identifier and a domain name. Once the link is confirmed, for example, by accessing a DID document to verify the DID and domain name are associated with respective fields in the document, changes can be made to the data associated with the DID, for example, to add an identifier (e.g., the verifiable credential).

Returning to the graduate and university example, the computing device(s) 104 can be associated with the registrant 112 (e.g., the university) to generate a verifiable credential for sending to the graduate to make a secure and authorized claim about an account of the graduate associated with the registrant's domain name. The computing device(s) 104 can, for example, associate the verifiable credential with a DID that is assigned to the domain name, and send the message 118 including the verifiable credential to a computing device associated with the graduate. Once received, the graduate can present the verifiable credential to show the claim made about them from the university as linked to the university's DID and domain name.

The message component 110 can represent functionality to receive, send, generate, or otherwise process messages for implementing the techniques described herein. In some examples, the message component 110 can generate or configure the message 118 to include a verifiable credential, a decentralized identifier, and the like. Including the computing device(s) 104 at the registrar 114 and/or the registry operator 116 enables the registrar 114 and/or the registry operator 116 to process DIDs as part of domain name registration or management.

The network(s) 120 can represent a variety of types of networks such as a blockchain network. For instance, the DID can be associated with a blockchain by assigning a DID method corresponding to an identifier of a particular blockchain (or similar platform for linking records via a cryptographic key. Additional examples of associating a domain name and a blockchain can be found, for example, in U.S. patent application Ser. No. 16/024,488, entitled, "Domain Name Blockchain User Addresses", filed on Jun. 29, 2019, and U.S. patent application Ser. No. 16/402,047 titled "Establishment, Management, and Usage of Domain Name to Blockchain Address Associations" filed May 2, 2019, the entireties of which are herein incorporated by reference for all purposes.

Figure 2:
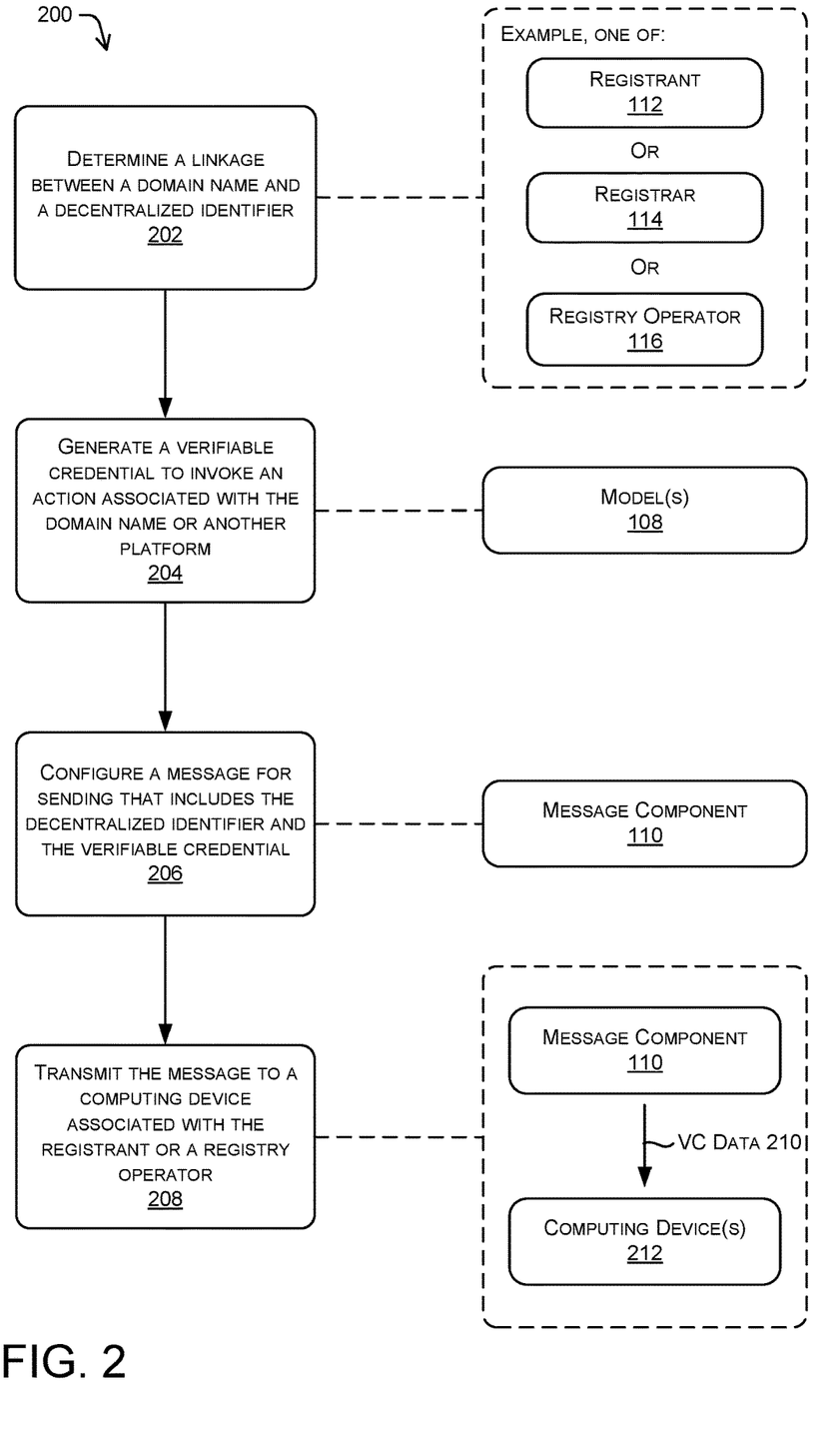
FIG. 2 is a pictorial diagram illustrating an example process by an example computing device to configure a message that includes a verifiable credential and a decentralized identifier associated with a domain name.

FIG. 2 is a pictorial diagram illustrating an example process 200 by an example computing device to configure a message that includes a verifiable credential and a decentralized identifier associated with a domain name. The example process 200 may be implemented by a computing device such as the computing device(s) 104 of FIG. 1.

An operation 202 can include determining a linkage between a domain name and a decentralized identifier. For example, one of: the registrant 112, the registrar 114, or the registry operator 116 can implement the computing device(s) 104 to receive a message (e.g., the message 118) from another entity (another of the registrant 112, the registrar 114, or the registry operator 116). The computing device(s) 104 can detect an existing linkage between the DID and the domain name by identifying a DID in the message and verifying that the DID is associated with the domain name (e.g., analyze a DID document).

In some examples, the operation 202 can include the detection component 106 and/or the model(s) 108 verifying the link by analyzing the DID document to compare a value or a field indicating that the domain name has designated the DID to have control, and that the DID points to the domain name to have control. For example, the model(s) 108 can identify fields in a decentralized document to confirm that the fields include data associated with the domain name and that the domain name reciprocates (e.g., the DID document includes the domain name and the DNS zone file has one or more TXT, URI, or TSLA record that matches data associated with the DID).

An operation 204 can include generating a verifiable credential to invoke an action associated with the domain name or another platform. For example, the model(s) 108 can generate a verifiable credential based on determining the linkage between the domain name and the DID. In some examples, the model(s) 108 can add the verifiable credential to a field associated with the DID. The verifiable credential can identify an entity or identifier for associating with the DID, for example.

An operation 206 can include configuring a message for sending that include the decentralized identifier and the verifiable credential. For example, the message component 110 can generate one or more messages for sending to another computing device(s) that includes the verifiable credential for processing to invoke an action to be performed. To configure the message, the message component 110 can include the DID having a field for the verifiable credential.

An operation 208 can include transmitting the message to a computing device associated with the registrant or a registry operator. For example, the computing device 104 can implement the message component 110 to transmit the message that includes the DID and the VC as part of VC data 210 to a computing device 212. In some examples, the computing device 212 can be associated with one of: the registrant 112 or the registry operator 116 that received the VC data 210 as part of processing a previously generated DID.

Figure 3:
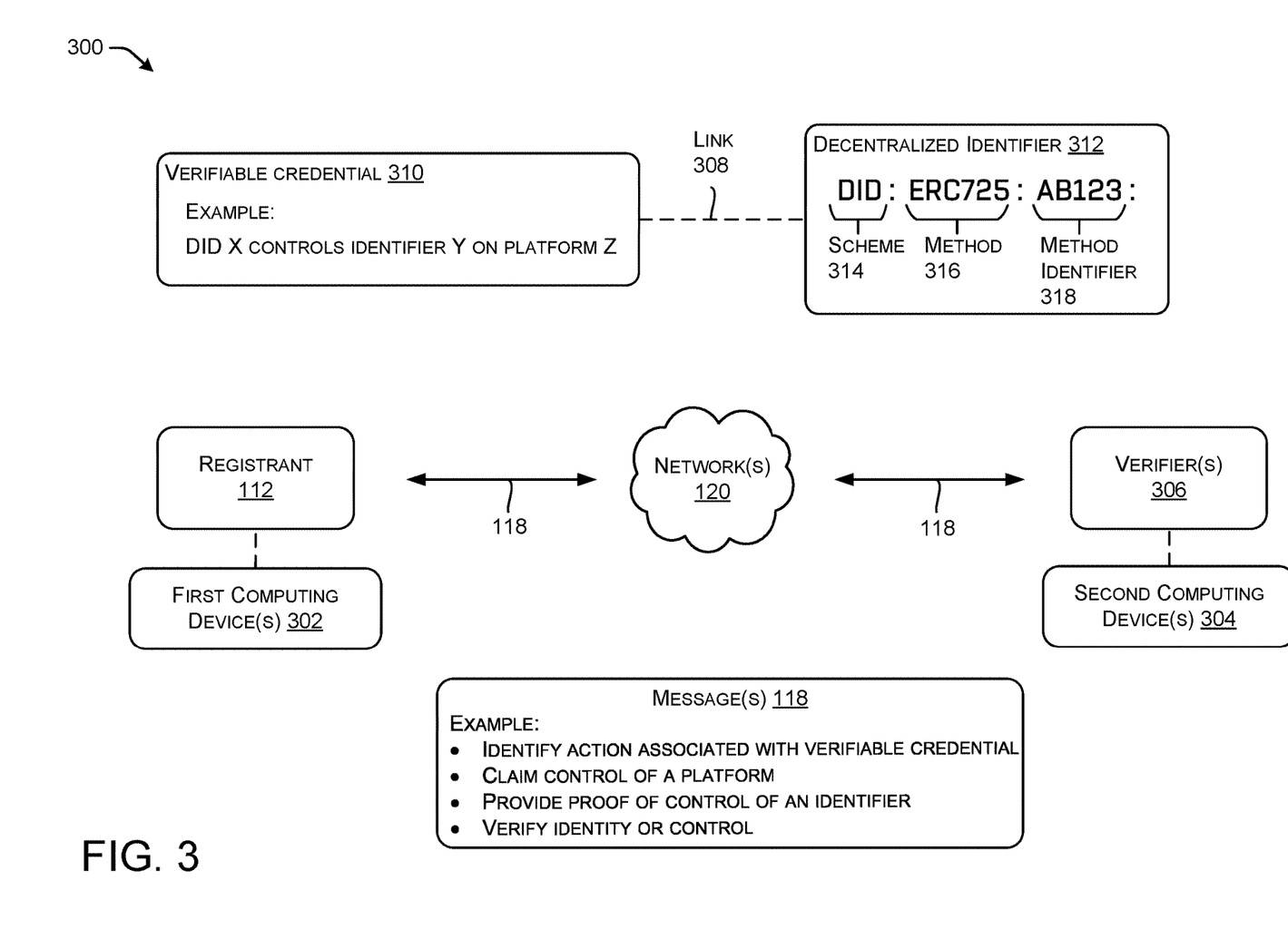
FIG. 3 illustrates an example block diagram of an example computer architecture for implementing techniques to link a decentralized identifier, a verifiable credential, and/or a domain name.

FIG. 3 illustrates an example block diagram of an example computer architecture 300 for implementing techniques to link a decentralized identifier, a verifiable credential, and/or a domain name. For example, a first computing device(s) 302 associated with the registrant 112 can exchange data (e.g., the message(s) 118) with a second computing device(s) 304 associated with one or more verifiers 306. In various examples, the first computing device(s) 302 and/or the second computing device(s) 304 can be configured to provide the functionality associated with the computing device(s) 104 of FIG. 1 (e.g., implement one or more of: the detection component 106, the model(s) 108, and the message component 110).

The verifier(s) 306 can, for example, represent a user accessing the domain name via the second computing device(s) 304. The verifier 306 can receive a verifiable credential to invoke an action, prove an identity, and so on. In some examples, the verifier 306 can determine that the DID includes the domain name in a correct value, field, or location and/or that the domain name is associated with identifiers that point to the correct Internet address, DID, etc. If verified, the verifier 306 can allow the verifiable credential to make claims on behalf of the domain name.

The first computing device(s) 302 and/or the second computing device(s) 304 can identify or determine a link 308 between a verifiable credential 310 and a decentralized identifier 312. As shown in FIG. 3, the decentralized identifier 312 includes a scheme 314, a method 316, and a method identifier 318. The model(s) 108 can generate the link 308 including adding the decentralized identifier 312 (or a portion thereof) in a field of the verifiable credential 310. For example, the verifiable credential 310 can represent machine-readable data, human-readable data, or a combination thereof that represents a statement asserting a claim on behalf of the domain name. For instance, the verifiable credential 310 may include data that logically comports to "DID X controls identifier Y on platform Z" to associate the DID with an identifier (e.g., the verifiable credential 310) such as the DID controls gamertag Y on the gaming platform Z.

In some examples, the verifiable credential 310 can include human-readable data (e.g., text or image) of one or more identifiers associated with or utilized by the verifier 306 on a platform different from a platform associated with the domain name of the registrant 112. In this way, an identifier of a gaming platform can be associated with another identifier of a social media platform in a trusted way that enables either identifier to be recognized as the identity of the end user. Thus, the identifier for the social media platform can be used to access the gaming platform based on a decentralized identifier having a verifiable credential that verifies the relationship among the identifiers.

In some examples, the verifiable credential 310 can include a combination of machine-readable data and human-readable data. For example, the verifiable credential 310 include a hash at least partially identifying an image as belonging to the domain name, a time that the credential is valid from and/or until, or resource locator information such as a URI that identifies the location that the source content could be retrieved from.

In various examples, the detection component 106 can detect the scheme 314 to determine presence of a DID in a message or other data. The DID 312 can include one of a variety of different methods 316 that are associated with instructions (e.g., the method identifiers 318) that cause various actions. The method 316 can associated with a blockchain such as a bitcoin (method=BTCR) or other identity based method that defines who is authorized to act on behalf of the domain name. In some examples, the DID method 316 and/or the method identifier 318 can determine or retrieve data for use during execution of the DID 312 and/or the VC 310. In various examples, the verifiable credential 310 and/or the DID 312 can be defined in association with World Wide Web Consortium (W3C®).

In some examples, the model(s) 108 can generate, modify, and/or delete a verifiable credential(s) for use with a DID and/or a domain name. For example, the model(s) 108 can determine an action associated with the domain name using the decentralized identifier(s) and/or the verifiable credential(s). For instance, the model(s) 108 can validate an identity of the registrant to enable the association between the decentralized identifier and the verifiable credential. Additionally, or alternatively, the model(s) 108 can store data (e.g., DID data, verifiable credential data, etc.) for access by another computing device or third-party that uses the stored data to invoke the actions associated with the claims in the verifiable credentials.

In various examples, the message component 110 can generate a message that includes the DID and the VC for sending to a computing device over a network to cause the computing device to invoke the action associated with the VC. Additionally, or alternatively, the message component 110 can determine data for exchanging between two or more of: the registrant 112, the registrar 114, and the registry operator 116. For example, the model(s) 108 can generate a verifiable credential or verifiable presentation responsive to a request from the registrant 112, the verifier 306, or other entity. In various examples, the verifiable credential can be used to verify an identity of the registrant 112 (or content associated therewith).

Figure 4:
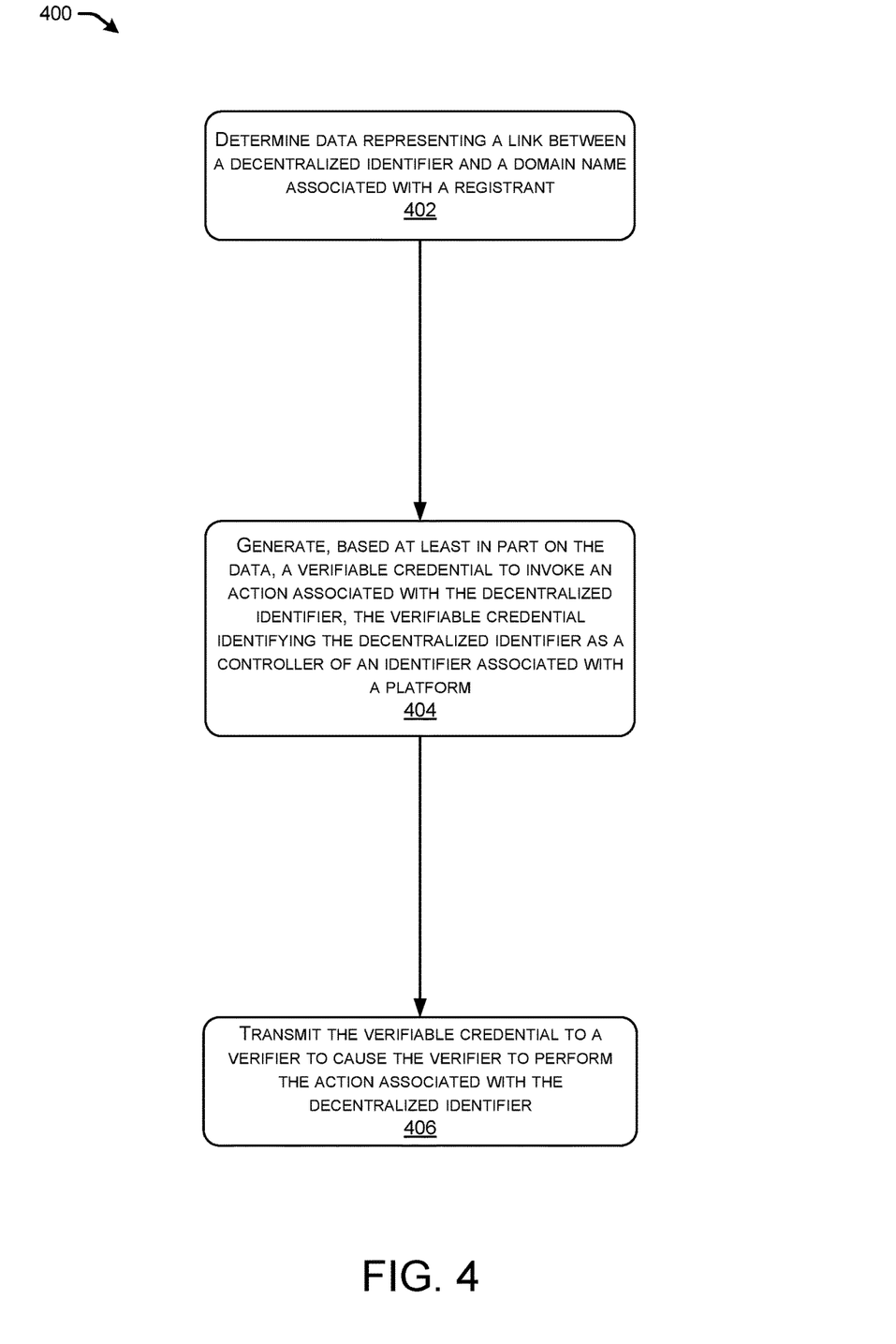
FIG. 4 is a flowchart depicting an example process for generating a verifiable credential to associate with a decentralized identifier.

FIG. 4 is a flowchart depicting an example process 400 for generating a verifiable credential to associate with a decentralized identifier. For example, some or all of the process 400 can be performed by one or more components in FIG. 1, as described herein. For example, some or all of the process 400 can be performed by the computing device(s) 104.

At operation 402, the process may include determining data representing a link between a decentralized identifier and a domain name associated with a registrant. In some examples, the operation 402 may include a computing device associated with the registrar 114 or the registry operator 116 receiving a message comprising a request to associate a verifiable credential with a decentralized identifier from a registrant 112. The model(s) 108 can detect the decentralized identifier 312 and retrieve a DID document that confirms the link between the decentralized identifier and the domain name associated with the registrant. In some examples, the model(s) 108 may confirm that first data associated with the domain name matches second data that stored in the DID document. The link can, for example, represent a first link established by the DNS to the DID and a second link established by the DID to the DNS (e.g., a bi-directional linkage).

At operation 404, the process may include generating, based at least in part on the data, a verifiable credential to invoke an action associated with the decentralized identifier. In some examples, the operation 404 may include the model(s) 108 identifying an existing DID included in the message data. In various examples, the verifiable credential can identify the decentralized identifier as a controller of an identifier associated with a platform. The model(s) 108 can also or instead link the verifiable credential 310 and the DID 312 with the domain name in a DID document.

At operation 406, the process may include transmitting the verifiable credential to a verifier to cause the verifier to perform the action associated with the decentralized identifier. In various examples, the computing device associated with the registrar 114 or the registry operator 116 can transmit the verifiable credential 310 as part of the DID 312 to registrant 112. The verifiable credential 310 can be used in a variety of ways depending upon a configuration, and the claim(s) made and may be communicated over a network to verify the identity of the registrant 112 to another entity or device. In various examples, process 400 may return to 402 after performing operation 406.

Figure 5:
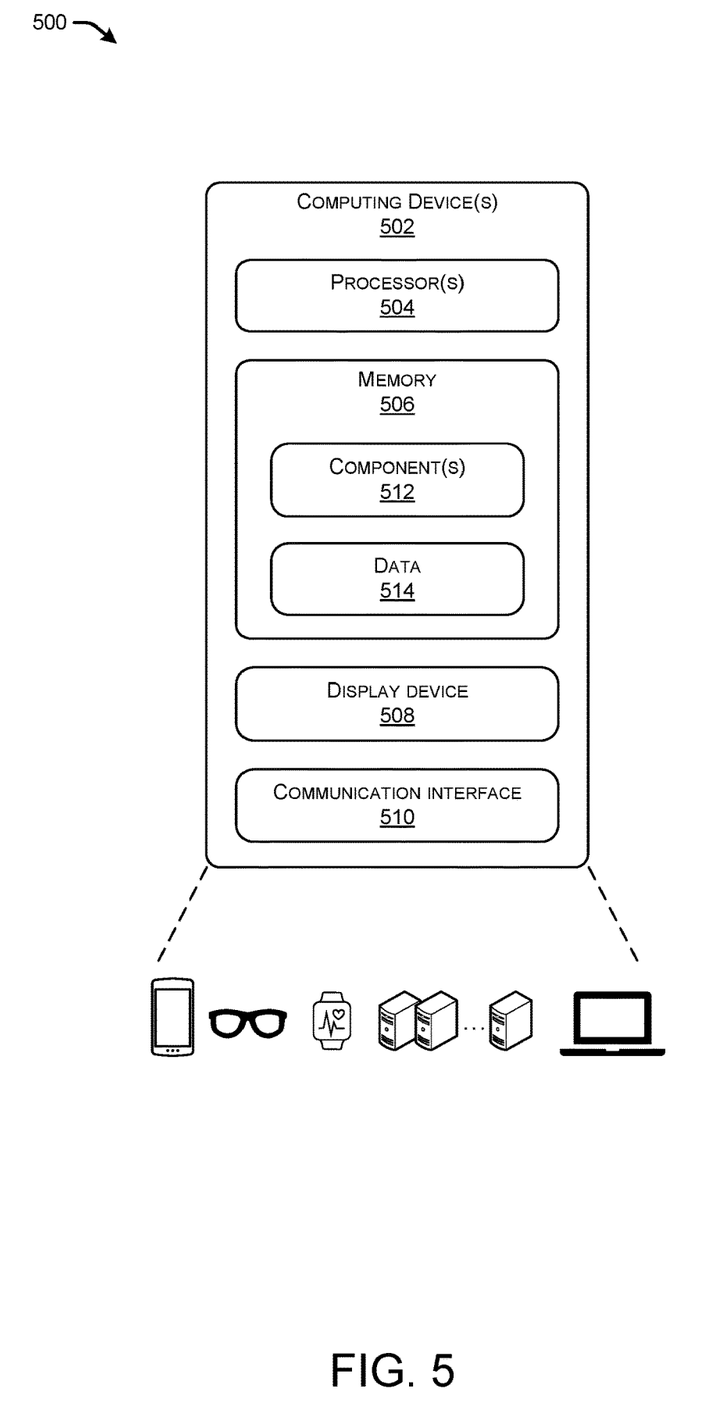
FIG. 5 depicts an example system architecture for an example computing device.

FIG. 5 depicts an example computing device 500 for implementing the techniques described herein. For example, the computing device(s) 502 comprises processor(s) 504, memory 506, a display device 508, and a communication interface 510. As shown in FIG. 5, the memory 506 comprises one or more components 512 and data 514. In some examples, the computing device(s) 502 can be configured to perform the functionality of the computing device(s) 104.

The processor(s) 504 can be any suitable processor capable of executing instructions to process data and perform operations as described herein. By way of example and not limitation, the processor(s) 504 can comprise one or more Central Processing Units (CPUs), Graphics Processing Units (GPUs), Tensor Processing Units (TPUs), or any other device or portion of a device that processes electronic data to transform that electronic data into other electronic data that can be stored in registers and/or memory. In some examples, the processor(s) can represent a Redundant Array of Inexpensive Disk drives (RAID) configuration. In some examples, integrated circuits (e.g., ASICs, etc.), gate arrays (e.g., FPGAs, etc.), and other hardware devices configured to implement encoded instructions can also be considered processors. In various examples, the processor(s) 504 can be communicatively coupled to the memory 506 and be configured to execute instructions stored on or otherwise associated with the memory 506 to implement the techniques described herein.

In various examples, the memory 506 can include system memory, which may be volatile (such as RAM), non-volatile (such as ROM, flash memory, etc.) or some combination of the two. The memory 506 can also or instead include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device(s) 502.

The memory 506 can store one or more components 512 and/or data 514 represent an operating system, a software application, instruction, program, and/or data to implement the methods described herein and the functions attributed to the various systems. The architectures, systems, and individual elements described herein can include many other logical, programmatic, and physical components, of which those shown in the accompanying figures are merely examples that are related to the discussion herein. In some examples, the memory can represent an Error-Correcting Code (ECC) memory hardware device, or other storage device.

A display device 508 can represent an output device capable of presenting information for display. For example, the display device 508 can represent a liquid crystal display, a touch-sensitive display, a peripheral display, or other device for presenting data associated with a domain name.

The communication interface 510 can represent functionality to communicatively couple the computing device(s) 502 to a network, such as the network 120 of FIG. 1 to enable an exchange of data with another commuting device. In various examples, the communication interface 510 can include a physical network interface, such as a network adapter, communication device, transceiver, modems interfaces, antenna, or the like. The communications interface 510 can also or instead include logical interfaces for connecting the computing device(s) 502 to another computing device or one or more external networks (e.g., the Internet). For example, the communications interface 510 can enable Wi-Fi-based communication such as via frequencies defined by the IEEE 802.11 standards, short range wireless frequencies such as Bluetooth, cellular communication (e.g., 2G, 3G, 4G, 4G LTE, etc.), satellite communication, dedicated short-range communications (DSRC), or any suitable wired or wireless communications protocol that enables the respective computing device to interface with the other computing device(s).

The component(s) 512 can represent the detection component 106, the model(s) 108, and/or the message component 110, just to name a few. Generally, the component(s) 512 can represent functionality implemented by the computing device(s) 502 to perform or enable performing any action taken by the computing device(s) 502. The data 514 can include a platform, an operating system, an application, and/or other information (e.g., a decentralized identifier, a verifiable credential, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For example, and without limitation, the operation 208 of FIG. 2 and/or the operation 406 of FIG. 4 (and/or other operations) can be omitted from the respective processes. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the one or more processors to perform operations comprising:
   determining data representing a link between a decentralized identifier and a domain name associated with a registrant;
   generating, based at least in part on the data, a verifiable credential to invoke an action associated with the decentralized identifier, the verifiable credential identifying the decentralized identifier as a controller of an identifier associated with a platform; and
   transmitting the verifiable credential to a verifier to cause the verifier to perform the action associated with the decentralized identifier,
   wherein:
   the verifiable credential indicates a claim on behalf of the domain name, and
   the action associated with the domain name comprises at least one of: a claim on behalf of the domain name, proof of an account on another platform, proof of control of an identifier associated with another domain name, or proof of content associated with the domain name.

2. The system of claim 1, the operations further comprising:
   determining validity of the verifiable credential based at least in part on a cryptographic key,
   wherein the transmitting is based at least in part on the validity.

3. The system of claim 1, the operations further comprising:
   causing the verifier to validate the verifiable credential by comparing a record in a decentralized document with data included in the verifiable credential to confirm that the record and the data match.

4. The system of claim 1, wherein the link between the decentralized identifier and the domain name includes a first link between the domain name and the decentralized identifier and a second link between the decentralized identifier and the domain name.

5. A computer-implemented method comprising:
  determining data representing a link between a decentralized identifier and a domain name associated with a registrant;
  generating, based at least in part on the data, a verifiable credential to invoke an action associated with the decentralized identifier, the verifiable credential identifying the decentralized identifier as a controller of an identifier associated with a platform; and
  transmitting the verifiable credential to a verifier to cause the verifier to perform the action associated with the decentralized identifier,
  wherein:
    the verifiable credential indicates a claim on behalf of the domain name, and
    the action associated with the domain name comprises at least one of: a claim on behalf of the domain name, proof of an account on another platform, proof of control of an identifier associated with another domain name, or proof of content associated with the domain name.

6. The computer-implemented method of claim 5, further comprising:
  determining validity of the verifiable credential based at least in part on a cryptographic key,
  wherein the transmitting is based at least in part on the validity.

7. The computer-implemented method of claim 5, further comprising:
  causing the verifier to validate the verifiable credential by comparing a record in a decentralized document with data included in the verifiable credential to confirm that the record and the data match.

8. The computer-implemented method of claim 7, wherein:
  the record is an association between a uniform resource identifier (URI) and an authentication record, a server certificate, or public key.

9. The computer-implemented method of claim 5, wherein:
  the link between the decentralized identifier and the domain name includes a first link between the domain name and the decentralized identifier and a second link between the decentralized identifier and the domain name.

10. The computer-implemented method of claim 5, further comprising:
  transmitting the verifiable credential to a computing device associated with a user having an account associated with the platform.

11. The computer-implemented method of claim 5, wherein the verifiable credential is a first verifiable credential, the identifier is a first identifier, and the platform is a first platform, and further comprising:
  receiving a request to add a second identifier associated with a second platform to a second verifiable credential; and
  associating the decentralized identifier with the second verifiable credential as evidence that the registrant controls the first identifier associated with the first platform and the second identifier associated with the second platform.

12. The computer-implemented method of claim 5, further comprising:
  transmitting the verifiable credential to the registrant to enable control of the platform using the domain name.

13. The computer-implemented method of claim 5, wherein the generating and the transmitting are performed by the registrant.

14. One or more non-transitory computer-readable media storing instructions that, when executed, cause one or more processors to perform operations comprising:
  determining data representing a link between a decentralized identifier and a domain name associated with a first entity;
  generating, based at least in part on the link, a verifiable credential to invoke an action associated with the decentralized identifier, the verifiable credential identifying the decentralized identifier as a controller of an identifier associated with a platform; and
  transmitting the verifiable credential to a verifier to cause the verifier to perform the action associated with the decentralized identifier,
  wherein:
    the verifiable credential indicates a claim on behalf of the domain name, and
    the action associated with the domain name comprises at least one of: a claim on behalf of the domain name, proof of an account on another platform, proof of control of an identifier associated with another domain name, or proof of content associated with the domain name.

15. The one or more non-transitory computer-readable media of claim 14, the operations further comprising:
  determining validity of the verifiable credential based at least in part on a cryptographic key,
  wherein the transmitting is based at least in part on the validity.

16. The one or more non-transitory computer-readable media of claim 14, the operations further comprising:
  causing the verifier to validate the verifiable credential by comparing a record in a decentralized document with data included in the verifiable credential to confirm that the record and the data match.

17. The one or more non-transitory computer-readable media of claim 14, wherein the link between the decentralized identifier and the domain name includes associating the decentralized identifier and the domain name as a value.

18. The one or more non-transitory computer-readable media of claim 14, the operations further comprising:
  determining validity of the verifiable credential based at least in part on a cryptographic key,
  wherein the transmitting is based at least in part on the validity.

19. The one or more non-transitory computer-readable media of claim 14, the operations further comprising:
  transmitting the verifiable credential to a computing device associated with a user having an account associated with the platform.

20. The one or more non-transitory computer-readable media of claim 14, the operations further comprising:
  transmitting the verifiable credential to the first entity to enable control of the platform using the domain name.

* * * * *